United States Patent
Shimizu et al.

(10) Patent No.: US 12,502,768 B2
(45) Date of Patent: Dec. 23, 2025

(54) ROBOT AND HAND ORIENTATION ADJUSTMENT METHOD

(71) Applicant: KAWASAKI JUKOGYO KABUSHIKI KAISHA, Kobe (JP)

(72) Inventors: Ippei Shimizu, Kobe (JP); Hiroyuki Okada, Kakogawa (JP); Daisuke Yamanaka, Oshu (JP); Takahiro Abe, Fuchu (JP); Junichi Sato, Oshu (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 308 days.

(21) Appl. No.: 18/024,500

(22) PCT Filed: Aug. 29, 2021

(86) PCT No.: PCT/JP2021/031630
§ 371 (c)(1),
(2) Date: Mar. 3, 2023

(87) PCT Pub. No.: WO2022/050204
PCT Pub. Date: Mar. 10, 2022

(65) Prior Publication Data
US 2023/0311306 A1    Oct. 5, 2023

(30) Foreign Application Priority Data

Sep. 4, 2020 (JP) ................. 2020-148887

(51) Int. Cl.
*B25J 9/16* (2006.01)
*B25J 9/04* (2006.01)
(Continued)

(52) U.S. Cl.
CPC ............. *B25J 9/1612* (2013.01); *B25J 9/042* (2013.01); *B25J 11/0095* (2013.01); *B25J 19/021* (2013.01)

(58) Field of Classification Search
CPC ....... B25J 9/04; B25J 9/042; B25J 9/06; B25J 9/1612; B25J 9/1664; B25J 11/0095;
(Continued)

(56) References Cited

U.S. PATENT DOCUMENTS

2013/0272824 A1*  10/2013  Iida ................. H01L 21/677
414/222.01
2015/0371886 A1*  12/2015  Sato ................. B25J 11/0095
294/81.5

(Continued)

FOREIGN PATENT DOCUMENTS

JP    2002270674 A  *  9/2002
JP    2002-289673 A    10/2002
(Continued)

OTHER PUBLICATIONS

English Machine Translation of JP2002270674A, Accessed Mar. 4, 2025.*
(Continued)

*Primary Examiner* — Jason Holloway
*Assistant Examiner* — Blake A Wood
(74) *Attorney, Agent, or Firm* — XSENSUS LLP (57) ABSTRACT

A robot that transfers a substrate includes an arm, a hand, a substrate orientation acquirer, a hand orientation adjuster, and a control unit. The hand is installed to the arm and holds and transfers the substrate. The substrate orientation acquirer acquires information about an orientation of a to-be-transferred substrate, which is the substrate to be transferred. The hand orientation adjuster adjusts an orientation of the hand with respect to the to-be-transferred substrate. The control unit controls operations of the arm, the hand, and the hand orientation adjuster. The control unit adjusts the orientation of the hand performing a taking-out operation on the to-be-transferred substrate by using the hand orientation adjuster based on the information about the orientation of the to-be-transferred substrate.

12 Claims, 6 Drawing Sheets

(51) Int. Cl.
*B25J 11/00* (2006.01)
*B25J 19/02* (2006.01)

(58) Field of Classification Search
CPC ...... B25J 13/05; B25J 15/0014; B25J 19/021;
G05B 2219/39476; G05B 2219/39527;
G05B 2219/45031; H01L 21/677
See application file for complete search history.

(56) References Cited

U.S. PATENT DOCUMENTS

| | | | |
|---|---|---|---|
| 2016/0091306 A1* | 3/2016 | Hashimoto | G01B 11/0608 |
| | | | 356/73 |
| 2016/0133502 A1* | 5/2016 | Won | B25J 9/1679 |
| | | | 901/46 |
| 2020/0185258 A1* | 6/2020 | Endo | H01L 21/681 |

FOREIGN PATENT DOCUMENTS

| | | | |
|---|---|---|---|
| JP | 2004-128021 A | | 4/2004 |
| JP | 2019149478 A | * | 9/2019 |
| JP | 2020053416 A | | 4/2020 |

OTHER PUBLICATIONS

English Machine Translation of JP2019149478A, Accessed Mar. 4, 2025.*

* cited by examiner

FIG. 4 hand insertion direction

FIG. 7 directions in which robot hand is moved to obtain detected thickness

FIG. 8

FIRST VARIATION hand insertion direciton

FIG. 9

ROBOT AND HAND ORIENTATION ADJUSTMENT METHOD

CROSS-REFERENCE TO RELATED APPLICATIONS

The present application is based on PCT filing PCT/JP2021/031630, filed Aug. 29, 2021, which claims priority to JP 2020-148887, filed Sep. 4, 2020, the entire contents of each are incorporated herein by reference.

TECHNICAL FIELD

The present disclosure chiefly relates to a robot for transferring a substrate that transfers substrates, such as semiconductor wafers and printed circuit boards. More particularly, the present disclosure relates to adjustment of an orientation of a hand that holds substrates.

BACKGROUND ART

Conventionally, there has been a known robot that takes out a substrate from a substrate storage apparatus, a substrate processing apparatus, or the like, and transfers it. PTL 1 discloses a wafer transfer apparatus, which is a robot of this type.

The wafer transfer apparatus of PTL 1 includes an orientation detector that detects an orientation of a hand and an actuator. In this wafer transfer apparatus, the orientation of the hand is adjusted by controlling a degree of expansion and contraction of the actuator based on information of the orientation of the hand detected by the orientation detector.

PRIOR-ART DOCUMENT(S)

Patent Document(s)

PTL 1: Japanese Patent Application Publication No. 2004-128021

SUMMARY OF THE INVENTION

Problems to be Solved by the Invention

When the wafer transfer apparatus of PTL 1 operates, an orientation of a substrate before getting held by the hand may be different from a usual orientation for some reason. If the orientation of the substrate is not appropriate, the substrate may be damaged during the process of being held by the robot.

The present disclosure is made in view of the situation described above, and its purpose is to provide a robot that is designed to flexibly adjust an orientation of its hand according to an orientation of a substrate before taking it out.

Means for Solving the Problems

The problem to be solved by the present disclosure is as described above. The means to solve this problem and the effects thereof will be described below.

A first aspect of the present disclosure provides a robot with a configuration described below. That is, a robot that transfers a substrate includes an arm, a hand, a substrate orientation acquirer, a hand orientation adjuster, and a hand orientation controller. The hand is installed to the arm and holds and transfers the substrate. The substrate orientation acquirer acquires information about an orientation of a to-be-transferred substrate, which is the substrate to be transferred. The hand orientation adjuster adjusts an orientation of the hand with respect to the to-be-transferred substrate. The hand orientation controller controls operation of the hand orientation adjuster. The hand orientation controller adjusts the orientation of the hand performing a taking-out operation on the to-be-transferred substrate by using the hand orientation adjuster based on the information about the orientation of the to-be-transferred substrate.

A second aspect of the present disclosure provides a hand orientation adjustment method described as follows. That is, a robot, to which this hand orientation adjustment method is applied, includes an arm, a hand, a substrate orientation acquirer, and a hand orientation adjuster, and transfers a substrate. In the hand orientation adjustment method, an orientation of the hand is adjusted. The hand is installed to the arm and holds and transfers the substrate. The substrate orientation acquirer acquires information about an orientation of a to-be-transferred substrate, which is the substrate to be transferred. The hand orientation adjuster adjusts an orientation of the hand with respect to the to-be-transferred substrate. In the hand orientation adjustment method, the orientation of the hand performing a taking-out operation on the to-be-transferred substrate is adjusted by using the hand orientation adjuster based on the information about the orientation of the to-be-transferred substrate.

This allows an operation of taking the to-be-transferred substrate out from the substrate storage apparatus or the like with the orientation of the hand adjusted according to the orientation of the substrate even if the orientation of the substrate is not appropriate. Therefore, the substrate can be taken out smoothly without, for example, being damaged.

Effects of the Invention

According to the present disclosure, before the robot takes out the substrate, the orientation of the hand can be flexibly adjusted according to the orientation of the substrate.

EMBODIMENT FOR CARRYING OUT THE INVENTION

Figure 1:
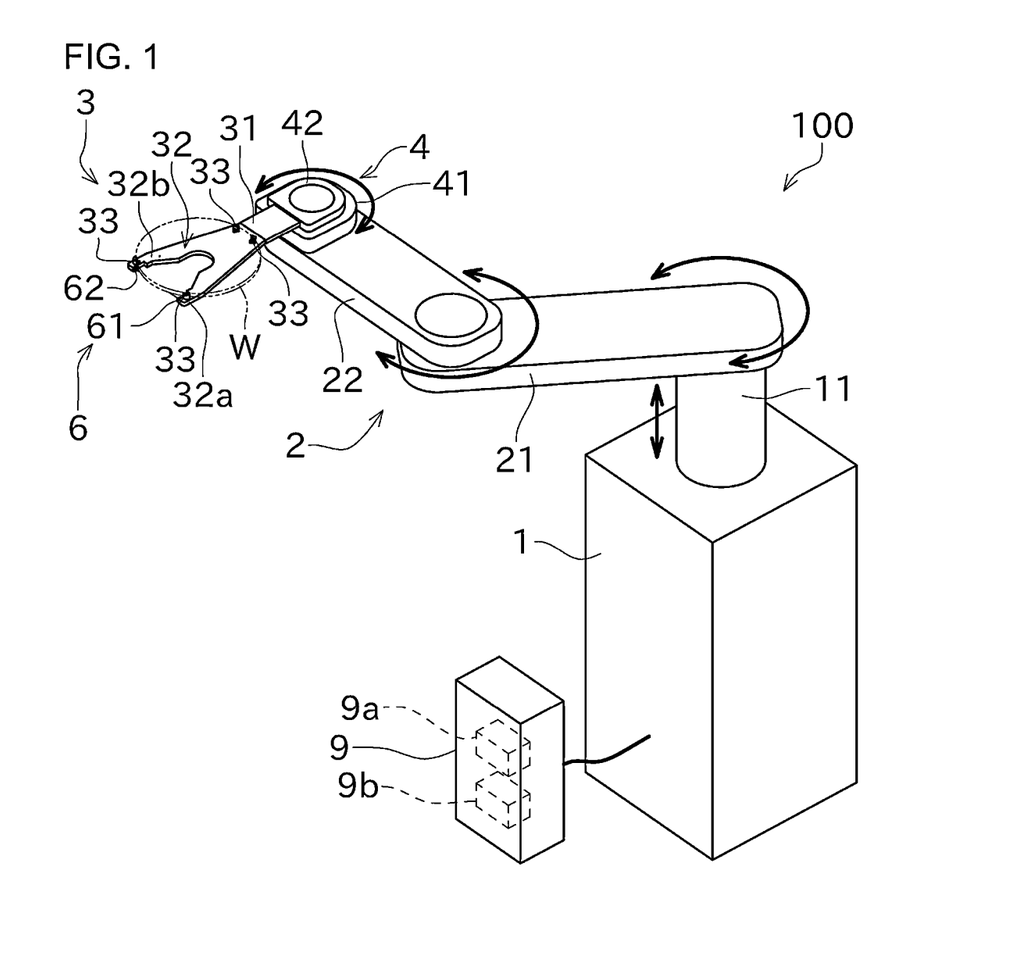
FIG. 1 is a perspective view showing an overall configuration of a robot according to one embodiment of the present disclosure.

The disclosed embodiments will be described below with reference to the drawings. FIG. 1 is a perspective view showing an overall configuration of a robot 100 according to one embodiment of the present disclosure.

The robot 100 shown in FIG. 1 is installed, for example, in a plant for the manufacture of a substrate W, such as a semiconductor wafer or a printed circuit board, or in a warehouse for storing the substrate W. The robot 100 is used to transfer the substrate W between a substrate processing apparatus and a substrate storage apparatus 7 which is described below. Note, however, that the robot 100 may also be used, for example, to transfer the substrate W between multiple substrate processing apparatuses that process the substrate W. The substrate W may be any of the following: a raw material for a substrate, a semi-finished product in process, or a finished product. The substrate W is disc-shaped in the present embodiment, but is not limited to this.

The robot 100 chiefly includes a base 1, a robot arm (an arm) 2, a robot hand (a hand) 3, a tilter (a hand orientation adjuster) 4, and a robot controller (a control unit) 9.

The base 1 is fixed to a floor of a factory or the like. Note, however, that the base 1 may also be fixed, for example, to a casing of a substrate processing facility equipped with the aforementioned substrate processing apparatus, without limitation. The base 1 may also be fixed to a moving cart, which is not shown in the drawings, that travels between the substrate processing apparatus (or facility) and the substrate storage apparatus 7.

As shown in FIG. 1, the robot arm 2 is installed to the base 1 with a lifting shaft 11 that can move in the vertical direction installed between them. The robot arm 2 can rotate with respect to the lifting shaft 11.

The robot arm 2 includes a horizontal articulated robot arm. The robot arm 2 includes a first arm 21 and a second arm 22.

The first arm 21 is comprised of an elongated member extending in a horizontal direction. One end of the first arm 21 in the lengthwise direction is installed to the upper end of the lifting shaft 11. The first arm 21 is rotatably supported to rotate around the (vertical) axis of the lifting shaft 11. The second arm 22 is installed to the other end of the first arm 21 in the lengthwise direction.

The second arm 22 is comprised of an elongated member extending in a horizontal direction. One end of the second arm 22 in the lengthwise direction is installed to the distal end of the first arm 21. The second arm 22 is rotatably supported to rotate about an (vertical) axis parallel to the lifting shaft 11. The robot hand 3 is installed to the other end of the second arm 22 in the lengthwise direction.

Each of the lifting shaft 11, the first arm 21 and the second arm 22 is driven by a suitable actuator, not shown in the drawings. These actuators may be, for example, electric motors.

Arm joints are located between the lifting shaft 11 and the first arm 21, between the first arm 21 and the second arm 22, and between the second arm 22 and the robot hand 3. An encoder, not shown in the drawings, is installed at each arm joint and detects rotational position of each of the first arm 21, the second arm 22 and the robot hand 3. Also, at an appropriate location on the robot 100, an encoder that detects changes in the position of the first arm 21 in the height direction (i.e., an amount of lift of the lifting shaft 11) is installed.

Based on positional information of the first arm 21, the second arm 22, or the robot arm 3 including information about their rotational position or vertical position detected by the corresponding encoder, the robot controller 9 controls the operation of the electronic motors that each drive one of the lifting shaft 11, the first arm 21, the second arm 22, and the robot hand 3. In the following description, the term "positional information" detected by the encoders shall mean a combination of positional information detected by each encoder that represents the pose of the robot 100.

The robot hand 3 includes a wrist 31 and a hand body 32, as shown in FIG. 1.

The wrist 31 is attached to the distal end of the second arm 22 with the tilter 4 installed between them. The wrist 31 is rotatably supported to rotate about an (vertical) axis parallel to the lifting shaft 11. Note, however, that the axis of rotation of the wrist 31 can be tilted with respect to a line parallel to the lifting shaft 11 by using the tilter 4. The configuration of the tilter 4 will be described in detail below. The wrist 31 is rotationally driven by a suitable actuator that is not shown in the drawings. This actuator may be, for example, an electric motor. The hand body 32 is connected to the wrist 31. The wrist 31 and the hand body 32 may be provided as one integrally formed member.

The hand body 32 is a member that acts in order to hold the substrate W. The hand body 32 includes a plate-like member formed in a Y-shape (or a U-shape). One end portion of the hand body 32 which is not connected to the wrist 31 (in other words, the distal portion) is split in two. In the following description, each of the bifurcated portions may be referred to as a first finger 32a and a second finger 32b.

Figure 4:
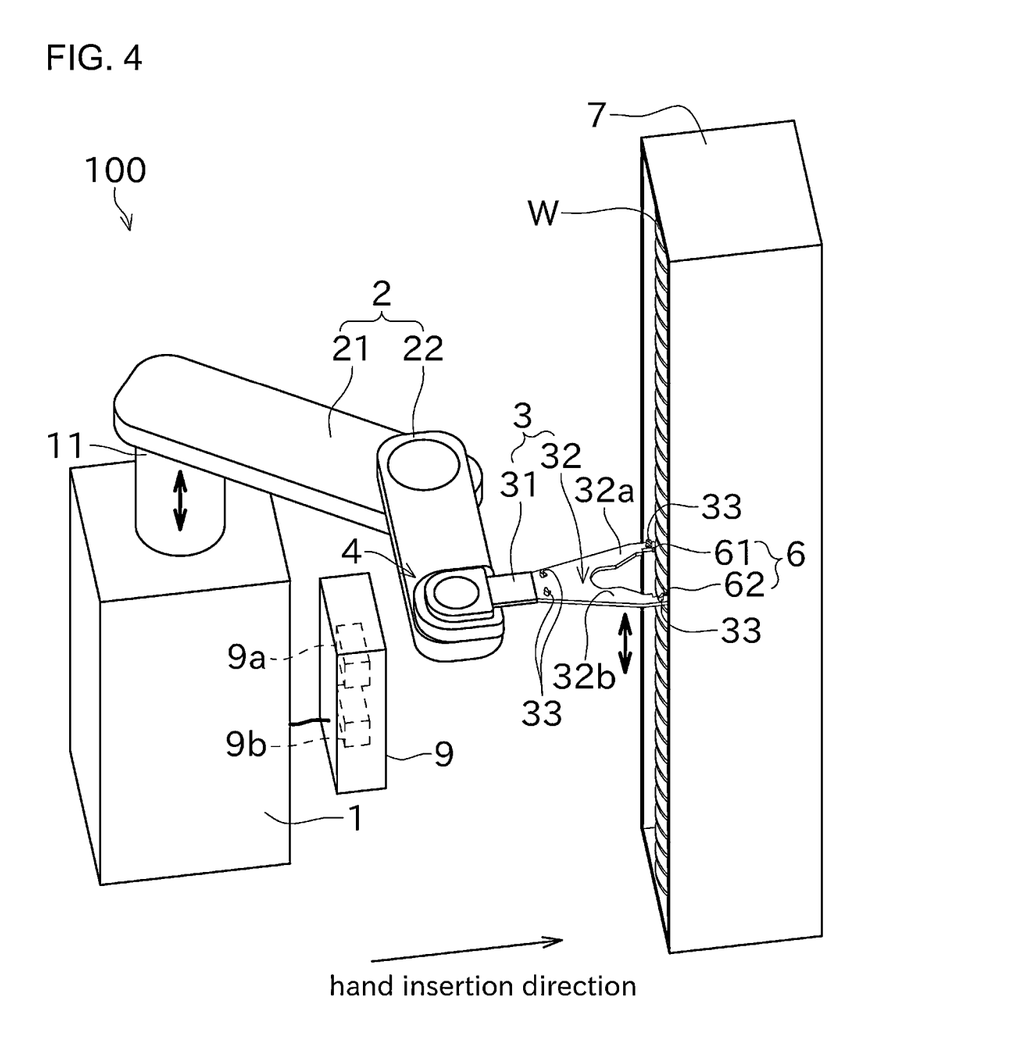
FIG. 4 is a drawing showing a robot acquiring an orientation of a to-be-transferred substrate.
Figure 5:
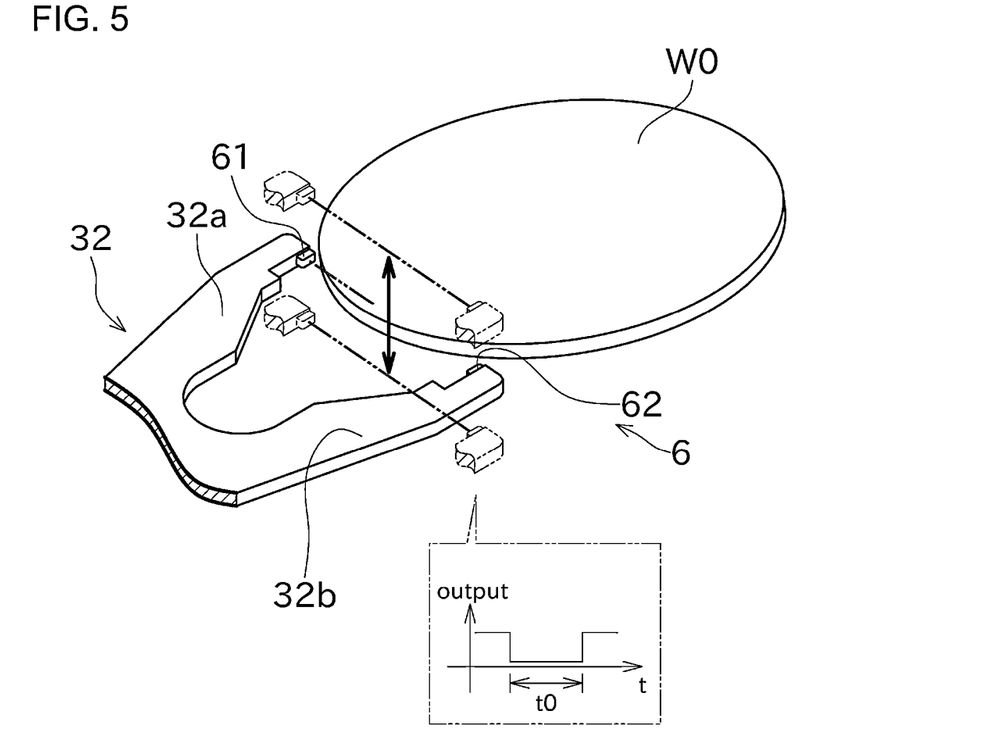
FIG. 5 is a drawing showing a robot hand moving up and down with respect to a to-be-transferred substrate.

The first finger 32a and the second finger 32b are formed to be symmetrical with each other. As shown in FIG. 4 and FIG. 5, a suitable distance is formed between the tips of the first finger 32a and the second finger 32b. This allows the edge of the substrate W to be positioned between the tips of the first finger 32a and the second finger 32b without the robot hand 3 coming into contact with the substrate W.

More than one guide member 33 for holding the substrate W is installed both on the distal portion and on the proximal portion of the hand body 3 of the present embodiment. The guide members 33 are comprised of, for example, rubber. The guide members 33 are installed to project upward from the hand body 32, which is a plate-like member. For example, as shown in FIG. 1, one guide member 33 is installed on each of the first finger 32a and the second finger 32b, and two guide members 33 are installed on the proximal end portion of the hand body 32.

As shown in FIG. 1, the guide members 33 contact portions of the bottom surface of the substrate W close to its rim and they hold the substrate W placed on the robot hand 3. By contacting the rim of the substrate W from the outside of the substrate W in the radial direction, the guide members 33 regulate the substrate W placed on the robot hand 3 so that it does not slide in the horizontal direction.

The configuration of the robot hand 3 to hold the substrate W is not limited to the configuration described above. The robot hand 3 may hold the substrate W by, for example, a structure that suctions the top surface or the bottom surface of the substrate W with negative pressure. For example, the robot hand 3 may be equipped with a known Bernoulli chuck to hold the substrate W in a non-contact manner.

The tilter 4 is installed to the distal portion of the second arm 22 (to the end portion opposite to the other end portion connected to the first arm 21).

Figure 2:
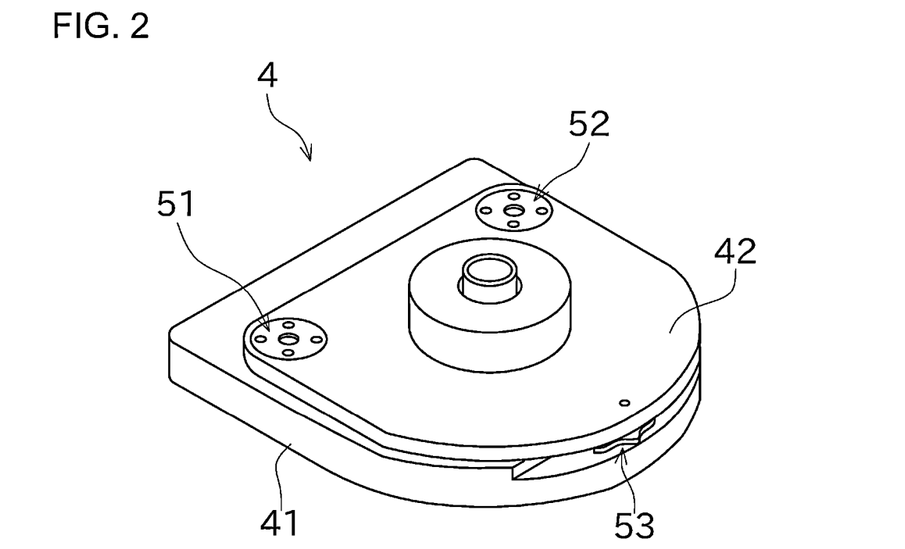
FIG. 2 is a perspective view showing an example of a tilter.

The tilter 4 includes a bottom plate 41 and the top plate 42 as shown in FIG. 2. The bottom plate 41 is fixed to the top surface of the second arm 22. The top plate 42 rotatably supports the wrist 31 of the robot hand 3. A height adjuster 5 is located between the bottom plate 41 and the top plate 42.

The tilter 4 adjusts the angle and direction of a tilt of the top plate 42 with respect to the bottom plate 41 by using this height adjuster 5.

Figure 3:
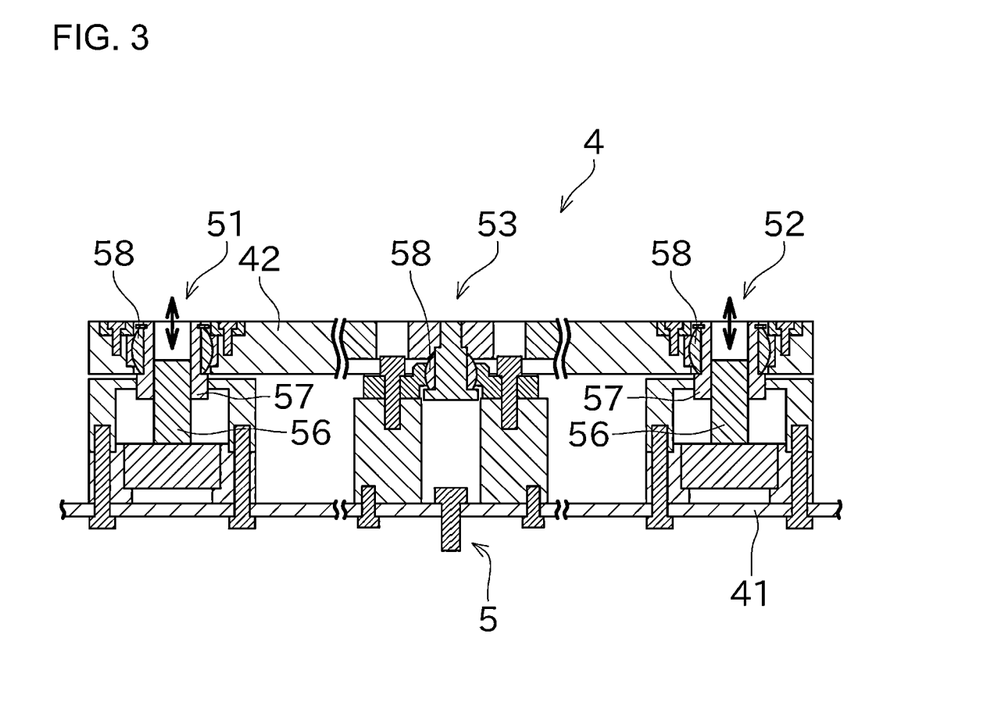
FIG. 3 is a cross-sectional view showing an example of a tilter.

The height adjuster 5 includes, for example, three supports 51, 52, 53 arranged at different positions between the bottom plate 41 and the top plate 42 as shown in FIG. 2. In FIG. 3, the supports 51, 52, and 53 are drawn as they are positioned in a straight line for convenience of explanation, but in actuality, as shown in FIG. 2, they are arranged to form a triangle in a plan view.

Each of the supports 51 and 52 includes an externally threaded member 56, an internally threaded member 57, and a spherical bearing 58. The threaded shafts of the externally threaded members 56 are rotatably supported by the bottom plate 41 with their axes pointing in a vertical direction. Actuators (for example, electric motors), that are not shown in the drawings, can separately rotate each of these threaded shafts arranged in the two supports, 51 and 52. Each of the internally threaded members 57 is coupled with the threaded shaft of the corresponding externally threaded member 56. When the threaded shaft is rotated, the corresponding internally threaded member 57 moves in a vertical direction. This movement allows the height at which the supports 51 and 52 support the top plate 42 to be changed. The spherical bearings 58 are located between the internally threaded members 57 and the top plate 42.

A spherical bearing 58 is arranged at the support 53. The support 53 does not have such function to change the height of support by using threads.

With the electric motors driven, the supports 51 and 52 independently change the height of the top plate 42 with respect to the bottom plate 41. In this manner, the angle and the direction of the tilt of the top plate 42 with respect to the bottom plate 41 are changed. As a result, the orientation (the angle and direction of the tilt) of the robot hand 3 with respect to the second arm 22 is adjusted. Note that, the configuration of the height adjuster (and thus the tilter 4) is not limited to this configuration described above.

As shown in FIG. 1, a mapping sensor (sensor) 6 is arranged at the distal portion of the hand body 32. The mapping sensor 6 allows a check of the presence or absence of the substrate W (that is, mapping) to be done in a non-contact manner. In the present embodiment, the mapping sensor 6 is comprised of, for example, a through-beam sensor including a light emitter 61 and a light receiver 62. Without limitation, the mapping sensor 6 may also be comprised of, for example, a reflective sensor.

As shown in FIG. 1 and in FIG. 4, the light emitter 61 is installed on the distal portion of the first finger 32a. The light receiver 62 is installed on the distal portion of the second finger 32b. The light emitter 61 emits a detection light toward the light receiver 62. The detection light may be, for example, but not limited to, infrared light.

The light receiver 62 is connected to the robot controller 9 wirelessly or by wire. The light receiver 62 outputs an electrical signal to the robot controller 9 indicating whether or not the detection light is received. When there is no object (for example, the substrate W) between the light emitter 61 and the light receiver 62, the detection light emitted from the light emitter 61 reaches the light receiver 62 and the light receiver 62 outputs an electrical signal indicating that the light is received. When there is an object between the light emitter 61 and the light receiver 62, the detection light emitted from the light emitter 61 is blocked by the substrate W, and the light receiver 62 outputs an electrical signal indicating that the light is not received.

When a plurality of spaces for placing the substrate W are arranged at suitable intervals in the vertical direction in the substrate storage apparatus 7, the robot controller 9 moves the robot hand 3 in the vertical direction across these spaces for placing, keeping the distal end of the robot hand 3 close to these spaces (mapping operation). At this time, the robot hand 3 is placed at such a position in a plan view that, when the substrate W is placed in the said space, the robot hand 3 is out of contact with the substrate W and the mapping sensor 6 can detect the substrate W. Based on the time-series data output from the mapping sensor 6 while the robot hand 3 is moved in the vertical direction, the presence or absence of the substrate W at each space for placing can be determined.

However, it is not limited to the above configuration. For example, when the robot hand 3 is moved in the vertical direction, the presence or absence of the substrate W may be determined corresponding to the positional information detected by the encoders, based on the output form the mapping sensor 6 corresponding to each position of the robot hand 3. In this case, the information about the presence or absence of the substrate W obtained from the output of the mapping sensor 6 and the positional information detected by the encoders are associated with each other.

As long as the light receiver 62 can detect the light emitted from the light emitter 61, the light emitter 61 and the light receiver 62 may be located any places of the robot hand 3. For example, the light emitter 61 may be built into the first finger 32a and the light receiver 62 may be built into the second finger 32b.

As shown in FIG. 1, the robot controller 9 is arranged separately from the base 1. Note, however, that the robot controller 9 may be arranged inside the base 1.

The robot controller 9 includes a substrate orientation acquirer 9a and a hand orientation controller 9b.

Specifically, the robot controller 9 is comprised of a known computer and includes a processing unit, such as a microcontroller, a CPU, a MPU, a PLC, a DSP, an ASIC or a FPGA, a memory unit, such as a ROM, a RAM or a HDD, and a communication unit that can communicate with an external apparatus. The memory unit stores a program to be executed by the processing unit, various thresholds, data on the shape of the substrate W to be transferred, such as thickness and size, or the like. The communication unit is configured to transmit results of the detection made by various sensors (for example, the mapping sensor 6 and the encoders) to the external apparatus and to receive the information about the substrate W or the like from the external apparatus. This collaboration of the hardware and the software enables the robot controller 9 to function as the substrate orientation acquirer 9a and the hand orientation controller 9b.

The detection of the orientation of the substrate W and the adjustment of the orientation of the robot hand 3 by the robot 100 of the present embodiment will be described in detail below with reference to the drawings from FIG. 4 to FIG. 7. The following description will be with reference to an example wherein a to-be-transferred substrate W0 stored in the substrate storage apparatus 7 is taken out from the substrate storage apparatus 7. In the following description, some configurations may be omitted in the drawings in order to illustrate each configuration of portions in a comprehensible way.

The substrate storage apparatus 7 shown in FIG. 4 is used to store the substrates W. In the substrate storage apparatus 7, a plurality of substrates (for example, 100 or more substrates) are placed at regular intervals in the vertical direction (i.e., the heightwise direction of the substrate storage apparatus 7) and stored.

In the substrate storage apparatus 7, the substrates W are usually stored in horizontal poses. However, for some reason, such as deformation of a shelf or presence of a foreign substance, sometimes the substrate W is stored in the substrate storage apparatus 7, having a non-horizontal orientation. The robot 100 of the present embodiment detects the orientation of the to-be-transferred substrate W0 (for example, its tilt with respect to a horizontal plane) and adjust the orientation of the robot hand 3 in order to make it parallel to the substrate W0 before taking the substrate W0 out from the substrate storage apparatus 7 and transferring it.

Although the to-be-transferred substrate W0 can tilt three-dimensionally, the substrate orientation acquirer 9a of the present embodiment acquires the tilt of the substrate W0 with respect to a horizontal plane observed with a line of sight along the direction in which the robot hand 3 is inserted to the substrate storage apparatus 7 (hereinafter, this direction is referred to as the hand insertion direction). In other words, the target to be acquired by the substrate orientation acquirer 9a is the tilt of the to-be-transferred substrate W0 in the roll direction with respect to the hand insertion direction.

Specifically, as shown in FIG. 5, the substrate orientation acquirer 9a moves the robot hand 3 so that a portion of the to-be-transferred substrate W0 is positioned between the first finger 32a and the second finger 32b, keeping the hand body 32 horizontal. At this time, the detection light emitted from the mapping sensor 6 is directed so as to be parallel to the suitable orientation of the substrate W0 and perpendicular to the hand insertion direction in a plan view.

Then, the substrate orientation acquirer 9a moves the lifting shaft 11 in the vertical direction to move the robot hand 3 in the vertical direction keeping it horizontal. As a result, a vertical scan is accomplished by the mapping sensor 6. For example, as shown in FIG. 5, the robot hand 3 moves from below to above or from above to below the to-be-transferred substrate W0. It is preferable to keep the speed of the movement of the robot hand 3 constant at this time in terms of ease of calculation of a detected thickness TH1 which is described below.

Figure 6:
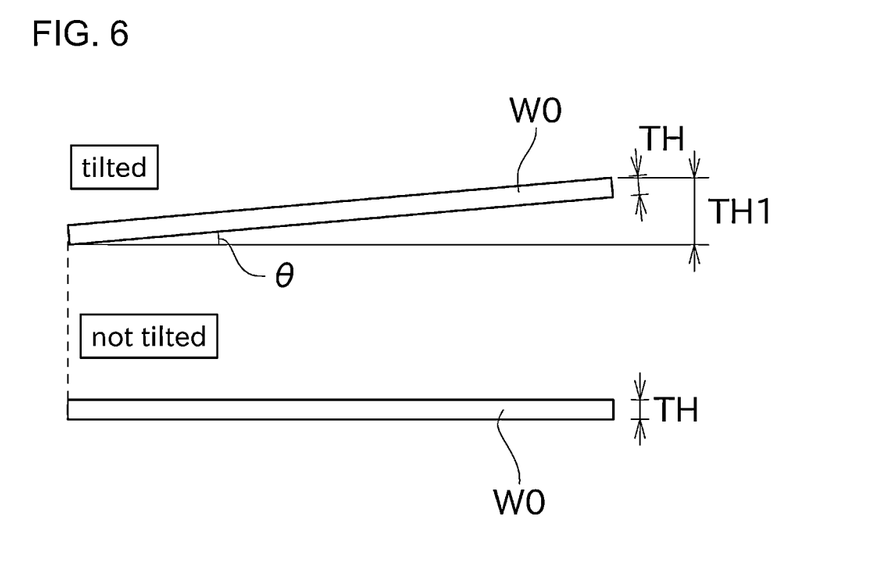
FIG. 6 is a drawing showing how detected thickness changes due to a tilt of a substrate.

The substrate orientation acquirer 9a calculates the detected thickness TH1 of the to-be-transferred substrate W0 in the vertical direction, based on the distance that the robot hand 3 moved in the vertical direction while the mapping sensor 6 is outputting signals indicating that no light received. The detected thickness TH1 is easily calculated based on an interception time t0 during which the light emitted from the light emitter 61 is intercepted by the substrate W to be examined while the robot hand 3 is moved up and down.

The substrate orientation acquirer 9a determines whether or not the difference between the calculated detected thickness TH1 and an actual thickness TH, which is the actual thickness of the to-be-transferred substrate W0, exceeds a predetermined threshold.

The actual thickness TH of the substrate W0 may be calculated in advance based on data, such as a design data and a manufacturing data of the substrate W0. Also, an average thickness obtained by measuring more than one substrate W0 may be used as the actual thickness TH. The robot controller 9 receives the actual thickness TH obtained as described above from an external apparatus via the communication unit in advance and stores it in the memory unit.

When the disc-shaped substrate W0 and the detection light of the mapping sensor 6 are parallel to each other, the detected thickness TH1 is substantially the same as the actual thickness TH. On the other hand, when the substrate W0 is tilted with respect to the detection light of the mapping sensor 6, the detected thickness TH1 becomes larger than the actual thickness TH.

Figure 7:
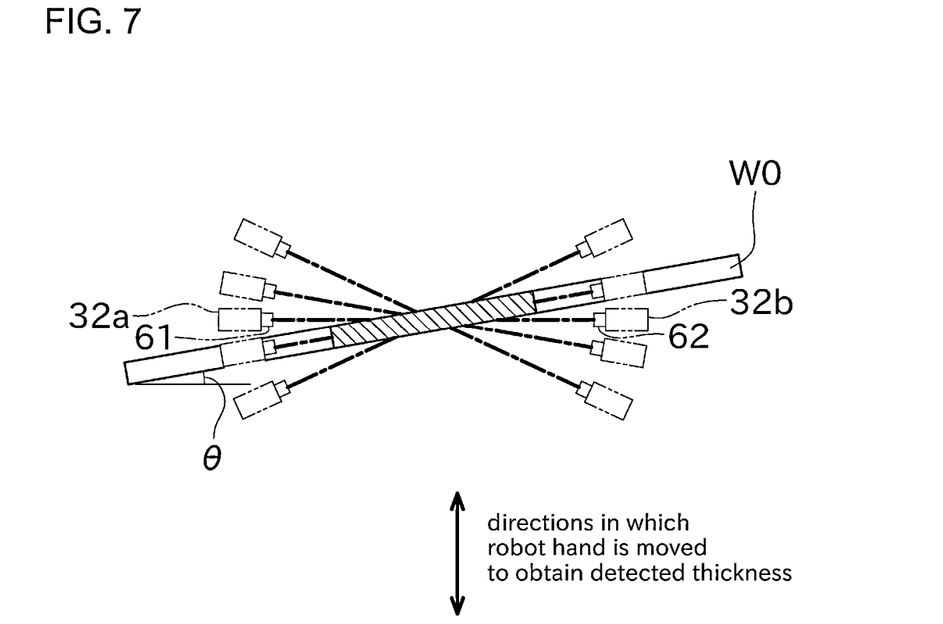
FIG. 7 is a conceptual illustration showing an orientation of a detection axis of a mapping sensor being changed in order to detect a tilt of a to-be-transferred substrate.

If the detected thickness TH1 minus the actual thickness TH is greater than the threshold, it means that the orientation of the substrate W0 is not horizontal. In this case, the substrate orientation acquirer 9a tilts the orientation of the detection light of the mapping sensor 6 in the roll direction by suitably tilting the robot hand 3 with respect to a horizontal plane. Then, the substrate orientation acquirer 9a moves the robot hand 3 up and down again to obtain the renewed detected thickness TH1. The detected thickness TH1 is acquired multiple times with the direction and magnitude of the tilt of the detection light in the roll direction suitably varied at each time. FIG. 7 conceptually shows how the detected thickness TH1 is acquired with the orientation of the detection light of the mapping sensor 6 varied.

When the detected thickness TH1 is acquired more than once, the substrate orientation acquirer 9a determines an angular degree of a tilt of the detection light corresponding to one of the detected thicknesses TH1 acquired that is closest in value to the actual thickness TH. This angular degree of the tilt corresponds to a tilt angle $\theta$ of the substrate W0 in the roll direction.

When the substrate orientation acquirer 9a acquires the tilt angle $\theta$ of the substrate W0, the hand orientation controller 9b operates the tilter 4 in order to tilt the robot hand 3 in the roll direction corresponding to the tilt angle $\theta$. As a result, the orientation of the robot hand 3 can be matched in the roll direction to the substrate W0 that has an unusual orientation. As the orientation of the robot hand 3 is changed, the height at which the robot hand 3 is inserted into the substrate storage apparatus 7 is also changed as necessary.

Then, the robot controller 9 controls the robot hand 3 so that it inserts itself below the to-be-transferred substrate W0 and takes the to-be-transferred substrate W0 out from the substrate storage apparatus 7. Because the orientation of the robot hand 3 is parallel to the to-be-transferred substrate W0 in the roll direction, damage occurred by unintended contact to objects, such as the substrate W0 can be prevented even if the orientation of the substrate W0 is different from the usual.

As described above, the robot 100 of the present embodiment is used to transfer the substrate W. The robot 100 includes the robot arm 2, the robot hand 3, the substrate orientation acquirer 9a, the tilter 4, and the hand orientation controller 9b. The robot hand 3 is installed to the robot arm 2 and holds and transfers the substrate W. The substrate orientation acquirer 9a acquires information about an orientation of the to-be-transferred substrate W0. The tilter 4 adjusts an orientation of the robot hand 3 with respect to the to-be-transferred substrate W0. The hand orientation controller 9b controls the operation of the tilter 4. The hand orientation controller 9b adjusts the orientation of the robot hand 3 performing a taking-out operation on the to-be-transferred substrate W0 by using the tilter 4 based on the information about the orientation of the to-be-transferred substrate W0.

This allows an operation of taking the to-be-transferred substrate W0 out from the substrate storage apparatus 7 or the like with the orientation of the robot hand 3 adjusted according to the orientation of the substrate W0 even if the orientation of the substrate W0 is not appropriate. Therefore, the substrate W0 can be taken out smoothly without, for example, being damaged.

In the robot 100 of the present embodiment, the tilter 4 can tilt an orientation of the robot hand 3.

This allows easy adjustment of the orientation of the robot hand 3 with a simple configuration.

In the robot 100 of the present embodiment, the substrate orientation acquirer 9a acquires the orientation of the to-be-transferred substrate W0 based on results of detection made by the mapping sensor 6 installed on the robot hand 3.

This enables the robot 100 to both detect the orientation of the substrate W0 and adjust the orientation of the robot hand 3. In this manner, enhancement of convenience is achieved.

In the robot 100 of the present embodiment, a sensor for detecting the orientation of the to-be-transferred substrate W0 includes the mapping sensor 6 that detects the presence or absence of the substrate W0 using a detection light. The substrate orientation acquirer 9a acquires the orientation of the to-be-transferred substrate W0 based on output of the mapping sensor 6 scanning the to-be-transferred substrate W0 with the detection light directed to various directions.

This allows detection of the orientation of the to-be-transferred substrate W0 with a simple configuration.

Figure 8:
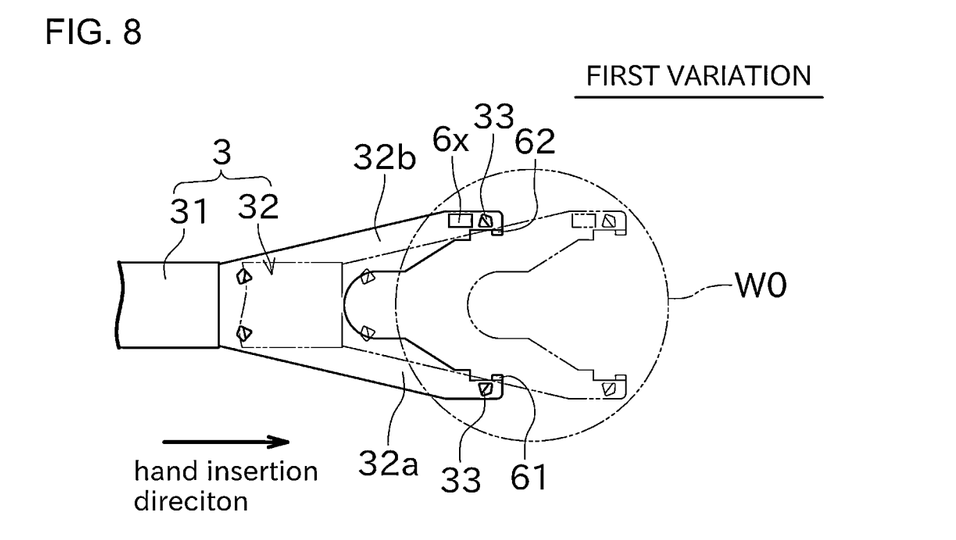
FIG. 8 is a planer view conceptually illustrating detection of an orientation of a to-be-transferred substrate in a first variation.

Next, a first variation of the embodiment described above will be described below. FIG. 8 is a plan view conceptually illustrating detection of an orientation of a to-be-transferred W0 in the first variation. In the description of the present variation, the same or similar components as that of the above-described embodiment may be marked with the same references in the drawings and the description thereof may be omitted.

The robot 100 of the present variation includes a rangefinder 6x in addition to the mapping sensor 6. The rangefinder 6x and the mapping sensor 6 are comprised in a sensor for detecting an orientation of the to-be-transferred W0. In the present variation, the rangefinder 6x is used to detect a tilt of the substrate W0 with respect to a horizontal plane observed with a line of sight along the direction perpendicular to the said hand insertion direction. In other words, the target to be detected by the rangefinder 6x is the tilt of the substrate W0 in the pitch direction with respect to the hand insertion direction.

The rangefinder 6x includes, for example, a laser displacement meter or an ultrasonic distance sensor. The rangefinder 6x is, as shown in FIG. 8, for example, installed on the top surface of the second finger 32b of the hand body 32. The rangefinder 6x detects a distance in the vertical direction between the rangefinder 6x and the bottom surface of the substrate W0 in a non-contact manner. The rangefinder 6x is connected to the robot controller 9 wirelessly or by wire, and transmits data of the distance to the substrate W0 measured at the measurement position to the robot controller 9.

The substrate orientation acquirer 9a inserts the robot hand 3 below the substrate W0 supported in the substrate storage apparatus 7 keeping the robot hand 3 horizontal. In this manner, the rangefinder 6x faces the substrate W0 vertically. Note that the guide member 33 does not hold the substrate W0 at this time. By moving the robot hand 3 horizontally along the hand insertion direction, the substrate orientation acquirer 9a measures distances between the rangefinder 6x and the substrate W0 to be examined at least at two points.

The substrate orientation acquirer 9a calculates the tilt of the substrate W0 in the pitch direction with respect to the hand insertion direction based on the difference of heights of the substrate W0 measured by the rangefinder 6x.

In the present variation, the tilt of the substrate W0 in the roll direction can be acquired by the mapping sensor 6 and its tilt in the pitch direction can be acquired by the rangefinder 6x. In this manner, the tilt of the substrate W0 can be acquired three-dimensionally so that the orientation of the robot hand 3 can be adjusted to be three-dimensionally parallel to the substrate W0 by the tilter 4. As the orientation of the robot hand 3 is changed three-dimensionally, the height at which the robot hand 3 is inserted into the substrate storage apparatus 7 is also changed as necessary. Similarly, the orientation of the robot hand 3 in the pitch direction with which the robot hand 3 is inserted into the substrate storage apparatus 7 is changed as necessary. In the manner described above, damage to objects, such as the substrate W0 can be prevented when the robot hand 3 takes out the substrate W0.

As described above, in the robot 100 of the present embodiment, the tilter 4 can tilt an orientation of the robot hand 3 in any direction. The substrate orientation acquirer 9a acquires three-dimensional information about an orientation of the to-be-transferred substrate W0. The hand orientation controller 9b three-dimensionally adjusts the orientation of the robot hand 3 performing a taking-out operation by using the tilter 4 based on the information about the orientation of the to-be-transferred substrate W0.

This allows adjustment of the orientation of the robot hand 3 corresponding to the to-be-transferred substrate W0 by the tilter 4, even if the substrate W0 three-dimensionally tilts. In this manner, damage to the substrate W0 is surely prevented.

Figure 9:
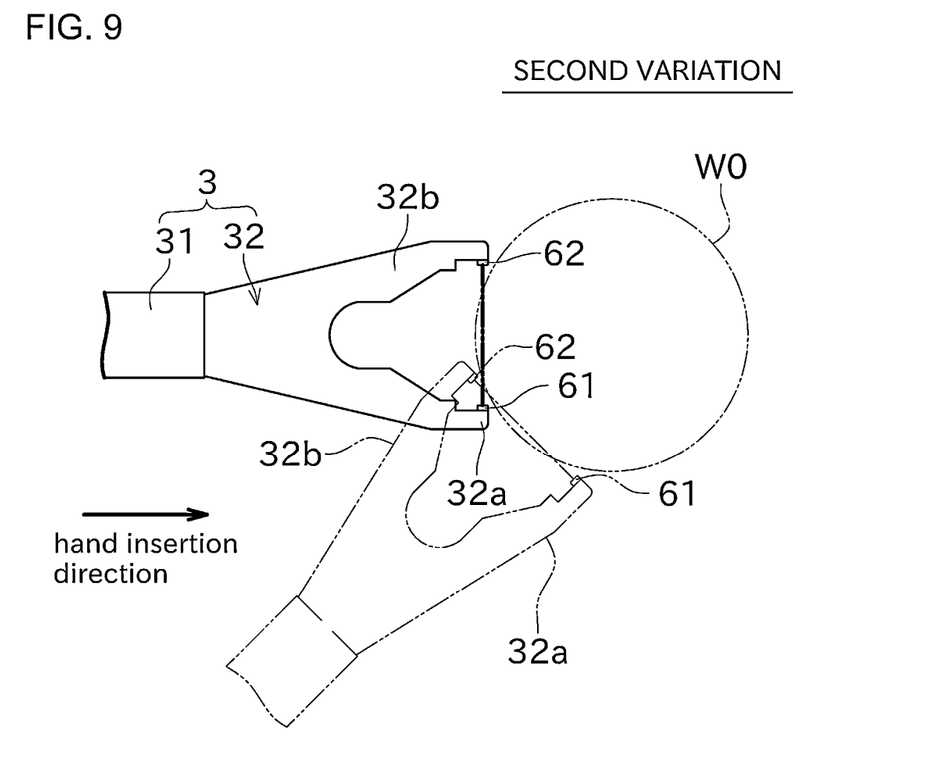
FIG. 9 is a planer view conceptually illustrating detection of an orientation of a to-be-transferred substrate in a second variation.

Next, a second variation of the above-described embodiment will be described below. FIG. 9 is a plan view conceptually illustrating detection of an orientation of the substrate W0 in the second variation. In the description of the present variation, the same or similar components as that of the above-described embodiment may be marked with the same references in the drawings and the description thereof may be omitted.

The robot 100 of the present variation includes only the mapping sensor 6 as the substrate orientation acquirer. In other words, the robot 100 does not include the rangefinder 6x.

In the present variation, the substrate orientation acquirer 9a performs the same measurements as in the embodiments described above, with the orientation of the detection light of the mapping sensor 6 in a plan view varied at each time, as shown in FIG. 9. As a result, a tilt of the substrate W0 is three-dimensionally detected. The hand orientation controller 9b three-dimensionally adjusts the orientation of the robot hand 3 corresponding to the substrate W0 based on the detected tilt of the substrate W0.

While the preferred embodiment and the variations of the present disclosure have been described above, the configurations described above may be modified as follows, for example.

The detected thickness TH1 may be determined based on results of detection made by the encoders (that is, positional information detected by the encoders) at times when the mapping sensor 6 starts outputting data indicating that no light is received and when it finishes outputting, instead of based on a vertical distance the robot hand 3 moves while the mapping sensor 6 is outputting data indicating that no light is received. In a case where the presence or absence of the substrate W is detected by the robot hand 3 moving up and down with its orientation maintained, the detected thickness TH1 may be calculated by using results of detection made only by the encoder that detects a positional change of the first arm 21 in the height direction (that is, the distance that the lifting shaft 11 moves).

The robot 100 may hold an object, such as a tray carrying the substrate W, instead of directly holding the substrate W to transfer.

The hand body 32 of the robot hand 3 may be integrally formed with the top plate 42 of the tilter 4.

In a case where the mapping sensor 6 scans the to-be-transferred substrate W0, the direction of scanning is not limited to the vertical direction and may be tilted with respect to the vertical direction.

The tilter 4 may be arranged between the base 1 and the lifting shaft 11, or between the lifting shaft 11 and the first arm 21, or between the first arm 21 and the second arm 22.

In the first variation shown in FIG. 8, the mapping sensor 6 may be omitted. In this case, the tilt of the to-be-transferred substrate W0 in the pitch direction can still be measured by the rangefinder 6x that horizontally scans the substrate W0 along the hand insertion direction. Also, to determine the tilt of the substrate W0, the rangefinder 6x may measure heights of three points on the substrate W that form a triangular shape in a plan view, with the robot hand 3 horizontally moved. In this case, the tilt of the to-be-transferred substrate W0 can be three-dimensionally determined by using only the rangefinder 6x.

In the robot hand 3 of the first variation, more than one rangefinder 6x may be arranged at different locations.

In the robot hand 3 of the first variation, the robot hand 3 may be non-horizontal while the tilt of the substrate W0 in the pitch direction is being measured by the rangefinder 6x. That is, after the tilt of the substrate W0 in the roll direction is firstly acquired by the mapping sensor 6, the robot hand 3 may be tilted in the roll direction corresponding to the substrate W0 and inserted below the substrate W0 before the rangefinder 6x starts measuring the height of the substrate W0.

The orientation of the to-be-transferred substrate W0 may be acquired by a suitable apparatus other than the robot 100. In this case, information about the orientation of the to-be-transferred substrate W0 obtained by the said other apparatus is input to the hand orientation controller 9b. The hand orientation acquirer 9a acquires the information about the orientation of the to-be-transferred substrate W0 from the other apparatus via the communication unit in advance and store it in the memory unit, instead of calculating and acquiring the tilt angle θ of the substrate W0.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A robot that transfers a substrate along an insertion direction, the robot comprising:
   an arm;
   a hand installed to the arm, wherein the hand includes a first finger and a second finger separated along a separation direction perpendicular to the insertion direction, and the hand to hold and transfer the substrate;
   a mapping sensor including a transmitter installed on the first finger and a receiver installed on the second finger;
   a tilter which adjusts an orientation of the hand with respect to the substrate; and
   a robot controller configured to
      acquire information, based on results of detection made by the mapping sensor, about an orientation of the substrate which is to be transferred; and
      control operation of the tilter to adjust the orientation of the hand performing a taking-out operation on the substrate based on the information, wherein
   the mapping sensor detects presence or absence of the substrate between the first finger and the second finger using a detection light,
   the tilter adjusts the orientation of the hand based on an output of the mapping sensor scanning the substrate with the detection light, and
   the robot controller is further configured to
      control movement of the hand in a vertical direction, perpendicular to both the insertion direction and the separation direction, relative to the substrate for the mapping sensor to perform the scanning and while maintaining the hand in a substantially horizontal orientation;
      calculate a detected thickness of the substrate based on a distance the hand moved in the vertical direction while the mapping sensor detected the presence of the substrate;
      determine whether a difference between the calculated detected thickness and a known actual thickness of the substrate exceeds a predetermined threshold;
      determine that the orientation of the substrate is tilted relative to the detection light in a case that the difference exceeds the predetermined threshold; and
      in a case that the difference exceeds the predetermined threshold, control the tilter to change a tilt of the hand relative to a horizontal plane to change the orientation of the detection light relative to the substrate.

2. The robot according to claim 1, wherein the tilter tilts the orientation of the hand in a desired direction, and the robot controller is further configured to
   acquire three-dimensional information about the orientation of the substrate, and
   control the tilter to three-dimensionally adjust the orientation of the hand performing the taking-out operation by using the hand based on the information about the orientation of the substrate.

3. The robot according to claim 1, further comprising:
   a rangefinder installed to the hand, the rangefinder to measure a vertical distance to the substrate, wherein
   the robot controller acquires the orientation of the substrate based on each of distances measured by the rangefinder at multiple points of the substrate.

4. The robot according to claim 1, wherein after the tilt of the hand is changed, the robot controller is configured to acquire a renewed detected thickness by moving the hand vertically relative to the substrate.

5. The robot according to claim 4, wherein the robot controller is further configured to
acquire multiple detected thicknesses, each corresponding to a different tilt of the detection light, and
determine the orientation of the substrate based on the tilt of the detection light corresponding to a detected thickness closest in value to the known actual thickness.

6. The robot according to claim 1, wherein the robot controller is configured to control the movement of the hand in the vertical direction at a constant speed during the scanning by the mapping sensor.

7. The robot according to claim 1, wherein the robot controller is further configured to acquire roll tilt information based on the output of the mapping sensor.

8. The robot according to claim 1, further comprising a rangefinder installed on the hand, the rangefinder configured to measure a vertical distance to the substrate.

9. The robot according to claim 1, wherein the tilter includes a tilter mechanism located between the arm and the hand.

10. The robot according to claim 9, wherein the tilter includes a top plate supporting the hand and a bottom plate fixed to the arm.

11. The robot according to claim 10, wherein the tilter further includes:
a height adjuster between the top plate and the bottom plate, and
the height adjusted includes at least two supports which change a height between the top plate and the bottom plate.

12. A method applied to a robot that transfers a substrate along an insertion direction, the robot including an arm, a hand installed to the arm, a mapping sensor installed to the arm, and a tilter, the method comprising:
detecting, with the mapping sensor, presence or absence of a substrate between a first finger and a second finger of the hand using a detection light, wherein a transmitter of the mapping sensor is installed on the first finger and a receiver of the mapping sensor is installed on the second finger;
acquiring information, based on results of the detecting, about an orientation of the substrate which is to be transferred;
controlling operation of the tilter to adjust an orientation of the hand performing a taking-out operation on the substrate based on the information, wherein the tilter adjusts the orientation of the hand based on an output of the mapping sensor scanning the substrate with the detection light;
controlling movement of the hand in a vertical direction, perpendicular to both the insertion direction and the separation direction, relative to the substrate for the mapping sensor to perform the scanning and while maintaining the hand in a substantially horizontal orientation;
calculating a detected thickness of the substrate based on a distance the hand moved in the vertical direction while the mapping sensor detected the presence of the substrate;
determining whether a difference between the calculated detected thickness and a known actual thickness of the substrate exceeds a predetermined threshold;
determining that the orientation of the substrate is tilted relative to the detection light in a case that the difference exceeds the predetermined threshold; and
in a case that the difference exceeds the predetermined threshold, controlling the tilter to change a tilt of the hand relative to a horizontal plane to change the orientation of the detection light relative to the substrate.

* * * * *